(12) United States Patent
Kamata et al.

(10) Patent No.: US 9,819,280 B2
(45) Date of Patent: Nov. 14, 2017

(54) INVERTER DEVICE

(71) Applicants: Hisahiro Kamata, Kanagawa (JP);
Yoshiyuki Shishido, Kanagawa (JP);
Masakazu Fujita, Kanagawa (JP)

(72) Inventors: Hisahiro Kamata, Kanagawa (JP);
Yoshiyuki Shishido, Kanagawa (JP);
Masakazu Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/044,066

(22) Filed: Feb. 15, 2016

(65) Prior Publication Data

US 2016/0248336 A1    Aug. 25, 2016

(30) Foreign Application Priority Data

Feb. 19, 2015  (JP) ................................. 2015-030204

(51) Int. Cl.
*H02M 5/458*    (2006.01)
*H02M 7/537*    (2006.01)
*H02M 1/00*    (2006.01)

(52) U.S. Cl.
CPC ........... *H02M 5/458* (2013.01); *H02M 7/537* (2013.01); *H02M 2001/0009* (2013.01)

(58) Field of Classification Search
CPC .... H02M 5/458; H02M 5/4585; H02M 5/447; H02M 5/4505; H02M 5/005;
(Continued)

(56) References Cited

U.S. PATENT DOCUMENTS 4,068,159 A * 1/1978 Gyugyi ................. H02J 3/1864
                                                323/211
5,680,302 A * 10/1997 Iwata ................. H02M 7/53873
                                                363/132
(Continued)

FOREIGN PATENT DOCUMENTS

JP    2524942    5/1996
JP    3353684    9/2002
(Continued)

OTHER PUBLICATIONS

U.S. Appl. No. 14/853,427, filed Sep. 14, 2015.

*Primary Examiner* — Jue Zhang
*Assistant Examiner* — Kevin H Sprenger
(74) *Attorney, Agent, or Firm* — Duft Bornsen & Fettig LLP (57) ABSTRACT

An inverter device applies an excitation current to an excitation winding of a step-up transformer through a switching element, and outputs an output voltage with an alternating-current half-wave waveform from an output winding of the step-up transformer. The inverter device includes: an input-voltage detecting unit that detects a state of the input voltage, as a voltage; a current detecting unit that converts a current flowing through the switching element into a voltage to detects the current; and a comparing unit that compares a detected current value detected by the current detecting unit with a detected input voltage value detected by the input-voltage detecting unit, and detects a high-current period in which the detected current value exceeds the detected input voltage value. Based on information indicating the high-current period detected by the comparing unit, the control circuit adjusts a period in which the switching element is turned on.

10 Claims, 5 Drawing Sheets

(58) Field of Classification Search
CPC ....... H02M 2001/0009; H02M 7/7575; H02M 7/268; H02M 7/493; H02M 7/53871; H02M 7/525; H02M 7/219; H02M 7/12; H02M 1/4208; H02M 1/4225; H02M 3/33507; H02M 3/33523; H02M 3/335; H02M 3/33515; H02M 3/33569; H02M 3/1563; H02M 3/3385; H02M 3/33561
USPC .................. 363/21.12–21.13, 37, 78, 79, 81
See application file for complete search history.

(56) References Cited

U.S. PATENT DOCUMENTS

| | | | |
|---|---|---|---|
| 6,239,559 | B1 | 5/2001 | Okamoto et al. |
| 8,971,081 | B2 | 3/2015 | Kamata |
| 9,030,856 | B2 | 5/2015 | Kamata |
| 9,160,225 | B2 | 10/2015 | Kamata |
| 2007/0085486 | A1* | 4/2007 | Okamoto ........... H05B 41/2881 315/209 R |
| 2007/0216396 | A1* | 9/2007 | Coulson ............ H02M 3/33507 324/117 R |
| 2009/0001944 | A1 | 1/2009 | Kim et al. |
| 2012/0212276 | A1* | 8/2012 | Ziegler ................ H02M 1/4225 327/303 |
| 2013/0077354 | A1* | 3/2013 | Behagel ........... H02M 3/33523 363/21.01 |
| 2014/0265911 | A1 | 9/2014 | Kamata et al. |
| 2014/0268966 | A1 | 9/2014 | Kamata |
| 2015/0200606 | A1 | 7/2015 | Nunokawa et al. |
| 2015/0271906 | A1 | 9/2015 | Kamata |
| 2015/0303812 | A1* | 10/2015 | Mao .................. H02M 3/33515 363/21.13 |
| 2016/0116925 | A1* | 4/2016 | Freeman ........... H02M 3/33546 307/130 |

FOREIGN PATENT DOCUMENTS

| | | |
|---|---|---|
| JP | 2009-011144 | 1/2009 |
| JP | 2012-135112 | 7/2012 |
| JP | 2015-180127 | 10/2015 |
| WO | 2007/060941 A1 | 5/2007 |

* cited by examiner

INVERTER DEVICE

CROSS-REFERENCE TO RELATED APPLICATIONS

The present application claims priority to and incorporates by reference the entire contents of Japanese Patent Application No. 2015-030204 filed in Japan on Feb. 19, 2015.

BACKGROUND OF THE INVENTION

1. Field of the Invention

The present invention relates to an inverter device.

2. Description of the Related Art

Switching regulators or inverter devices are used to supply high voltage to various devices such as a discharge tube for large-size plasma display and a plasma generator. In general, those with an output power value of about a few watts are commonly used; however, in plasma generators or the like, inverter devices with an output voltage of a dozen kilovolts and an alternating-current (AC) output power value of tens of watts or more are used.

A general switching regulator (an AC or DC-DC converter) intermittently applies a direct-current (DC) voltage to a primary-side excitation winding of a transformer for voltage conversion by causing a switching element to switch the DC voltage on and off, and rectifies and smooths an AC current generated in a secondary-side output winding, and then outputs a DC voltage. To maintain the output voltage at a constant voltage, for example, as shown in Japanese Laid-open Patent Publication No. 2009-11144, the switching regulator detects an output voltage and generates a feedback voltage, and performs pulse-width modulation (PWM) control for controlling the ratio of an ON time to an OFF time (the duty ratio) of the switching element on the basis of the feedback voltage.

This is to compensate for lack of output power by increasing the ON width of the switching pulses if the output power has decreased, or, on the contrary, to limit the excess output power by reducing the ON width if the output power has increased, thereby controlling the output voltage to be constant.

On the other hand, an inverter device intermittently applies a DC voltage to a primary-side excitation winding of a transformer for voltage conversion by causing a switching element to switch the DC voltage on and off in the same manner as the above-described switching regulator, and directly outputs an AC voltage generated in a secondary-side output winding to a load. In this case, for example, as shown in International Publication Pamphlet No. WO 2007/060941, the inverter device detects an output current instead of an output voltage, and converts the detected current to a voltage, and then performs PWM control on the switching element.

In a case of a switching regulator whose output voltage is DC voltage, as described in Japanese Laid-open Patent Publication No. 2009-11144, the switching regulator can detect the output voltage and perform PWM control on the switching pulses for ON/OFF control of a switching element. Furthermore, the output side has a retention time of an electrolytic capacitor of a smoothing circuit; therefore, the responsiveness of the control does not become a problem. However, the output of an inverter device is AC voltage; therefore, regardless of whether the output voltage is full wave or half wave, it is difficult to control the peak value of the output voltage (the peak voltage value) to be constant.

That is, the time of the peak voltage value is at a point, and a difference in voltage level is large, so the number of elements for detecting the peak value increases, and a delay in the control response time is caused by parasitic inductance. The higher the frequency of an output voltage waveform repeated, the more prominent the influence of the delay, and the peak voltage value drops too low or rises too high. In the worst case, a resonance frequency deviation is generated, and, when resonant voltage is applied, if an excitation current flows in an ON state of the next switching cycle, energy of a residual voltage which has nowhere to go becomes an excess current, resulting in an imbalance of resonance. This may cause a failure of the switching element due to power beyond its capacity, or may cause saturation of a transformer.

In this way, in a case of an inverter device whose output is AC voltage, switching frequency is as high as tens of kilohertz, and peak voltage value of output using voltage resonance is as high as a dozen kilovolts, there are a problem of the voltage resistance of an output-voltage detecting means or components and a problem of the time to complete in addition to the above-described problem of control responsiveness. Therefore, in such an inverter device, an input supply voltage is manually set by means of a lever, and an output voltage is just adjusted in accordance with the set input voltage; in general, the value of the output voltage is not constantly monitored.

In view of these circumstances, there is a need to provide an inverter device capable of controlling the peak voltage value of AC output voltage to be constant even if input voltage changes.

SUMMARY OF THE INVENTION

It is an object of the present invention to at least partially solve the problems in the conventional technology.

An inverter device causes a switching element turned on/off under control of a control circuit to switch an input voltage on/off, applies an excitation current to an excitation winding of a step-up transformer in a period in which the switching element is turned on, and outputs an output voltage with an alternating-current half-wave waveform from an output winding of the step-up transformer in a period in which the switching element is turned off. The inverter device includes: an input-voltage detecting unit that detects a state of the input voltage, as a voltage; a current detecting unit that converts a current flowing through the switching element into a voltage to detects the current; and a comparing unit that compares a detected current value detected by the current detecting unit with a detected input voltage value detected by the input-voltage detecting unit, and detects a high-current period in which the detected current value exceeds the detected input voltage value. Based on information indicating the high-current period detected by the comparing unit, the control circuit adjusts the period in which the switching element is turned on.

An inverter device causes a switching element turned on/off under control of a control circuit to switch an input voltage on/off, applies an excitation current to an excitation winding of a step-up transformer in a period in which the switching element is turned on, and outputs an output voltage with an alternating-current half-wave waveform from an output winding of the step-up transformer in a period in which the switching element is turned off. The inverter device includes: an input-voltage detecting unit that detects a state of the input voltage, as a voltage; a current detecting unit that converts a current flowing through the switching element into a voltage to detect the current; a first comparing unit that compares a detected current value detected by the current detecting unit with a detected input voltage value detected by the input-voltage detecting unit, and detects a high-current period in which the detected current value exceeds the detected input voltage value; an output-voltage detecting unit that detects a state of the output voltage, as a voltage corresponding to an instantaneous value thereof; and a second comparing unit that compares a detected input voltage value detected by the input-voltage detecting unit with a detected output voltage value detected by the output-voltage detecting unit, and detects a high-output period in which the detected output voltage value exceeds the detected input voltage value. Based on information indicating the high-current period detected by the first comparing unit and information indicating the high-output period detected by the second comparing unit, the control circuit adjusts the period in which the switching element is turned on.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be specifically described below on the basis of accompanying drawings.

Figure 1:
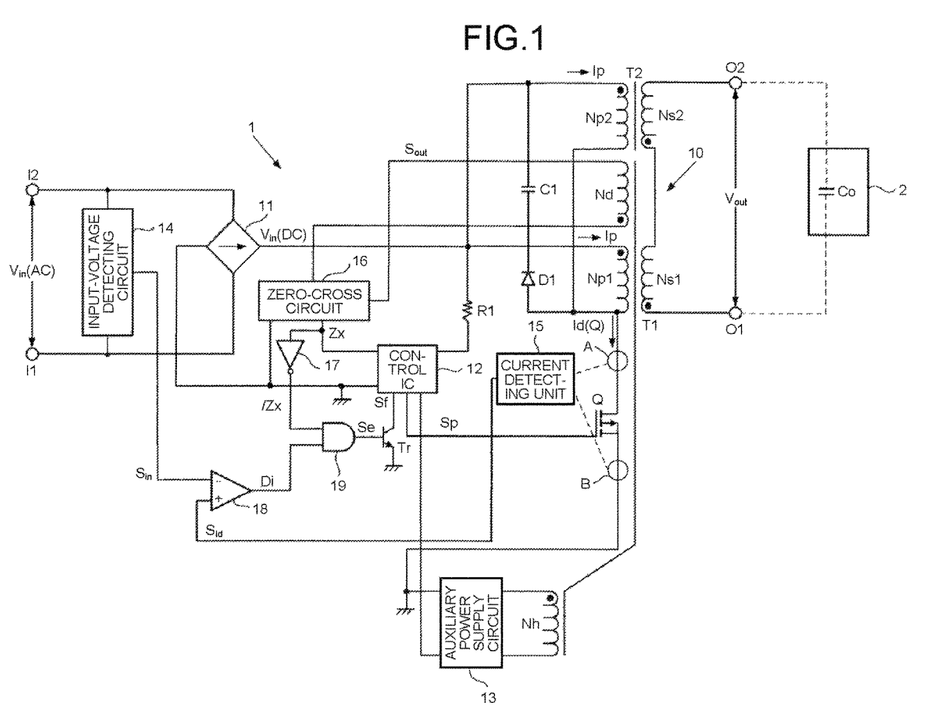
FIG. 1 is a circuit diagram showing a circuit configuration of an inverter device according to a first embodiment of the present invention.

FIG. 1 is a circuit diagram showing a circuit configuration of an inverter device according to a first embodiment of the present invention. An inverter device 1 shown in FIG. 1 includes, as its basic configuration, a step-up transformer 10, a switching element Q for turning on/off an excitation current, and a control IC 12 which is a control circuit for performing on/off control of the switching element Q. As the switching element Q, a field-effect transistor (FET) is used. The control IC 12 is an integrated circuit that outputs a switching signal Sp of a square-wave pulse to a gate of the switching element Q and performs pulse-width modulation (PWM) on the switching signal Sp to control on/off of the gate. Furthermore, the inverter device 1 also includes a full-wave rectifier circuit 11 for full-wave rectifying an AC input voltage $V_{in}$ of a commercial power supply input from input terminals I1 and I2.

In the present embodiment, the step-up transformer 10 is composed of a plurality of transformers T1 and T2 which have respective separate cores and the same characteristics. Respective excitation windings Np1 and Np2 of the transformers T1 and T2 are connected in parallel, and pulsating input voltage $V_{in}$ (DC) full-wave rectified by the full-wave rectifier circuit 11 is switched on and off by the switching element Q turned on/off under control of the control IC 12, and excitation current Ip is applied to the excitation windings Np1 and Np2 at the same time so that in a period in which the switching element Q is turned off, the time axes of waveforms of voltages induced by respective output windings Ns1 and Ns2 of the transformers T1 and T2 are synchronized with each other. The output windings Ns1 and Ns2 are connected in series, and an AC half-wave output voltage $V_{out}$ into which output voltages of the output windings Ns1 and Ns2 are superimposed is output from between output terminals O1 and O2 to a load 2.

A series circuit composed of a diode D1 and a capacitor C1, which is connected in parallel to a parallel circuit composed of the excitation windings Np1 and Np2 of the transformers T1 and T2, is a snubber circuit. A resistance R1 is a resistance for supplying the input voltage $V_{in}$ (DC) as a starting voltage to the control IC 12. It is preferable that the transformers T1 and T2 are each a resonant transformer which resonates with a resonant circuit composed of an inductance Ls of the corresponding output winding Ns1 or Ns2, a distributed capacity Cs, and a load capacity Co of the load 2 and its output voltage is proportional to the sharpness of the resonance.

The load 2 is, for example, a discharge unit that includes a discharge electrode and a counter electrode for plasma generation; an AC voltage output from the inverter device 1 is applied to between the discharge electrode and the counter electrode, thereby plasma is generated. There is the load capacity Co between the discharge electrode and the counter electrode. A dielectric is inserted between the discharge electrode and the counter electrode; when a voltage of 6 kilovolts [kV] or more has been applied to the dielectric, a streamer discharge (also referred to as a dielectric-barrier discharge, a creeping discharge, or a silent discharge), which is a type of plasma discharge, is generated. This generates plasma containing a large amount of activated species such as radicals.

The transformer T1, one of the transformers composing the step-up transformer 10, is provided with an auxiliary winding Nh and a tertiary winding (also referred to as a dependent winding) Nd on the same core besides the excitation winding Np1 and the output winding Ns1. When an excitation current is passing through the excitation winding Np1, the auxiliary winding Nh induces a voltage, and the voltage is rectified/smoothed by an auxiliary power supply circuit 13 and supplied as a power source for the operation of the control IC. In a period in which the switching element Q is turned off, in synchronization with an AC half-wave output voltage $V_{out}$ generated in a series circuit composed of the output windings Ns1 and Ns2, the tertiary winding Nd generates a voltage with a waveform whose peak value is smaller than the output voltage $V_{out}$ and generates an output-voltage detection signal $S_{out}$.

The number of turns in the tertiary winding Nd is much less than the number of turns in the output winding Ns1. Then, when the output voltage $V_{out}$ is equivalent to high voltage (600 V to 7 kV) or particularly-high voltage (over 7 kV), the peak value of voltage generated in the tertiary winding Nd is preferably at least a hundredth part of the output voltage or less, more preferably smaller than about a thousandth part of the output voltage. The tertiary winding Nd of the transformer T1 is an output-voltage detecting unit that detects a state of output voltage, as a voltage corresponding to an instantaneous value; however, in the first embodiment, the output-voltage detection signal $S_{out}$ is only used to detect a zero cross.

According to the present embodiment, without having to use a large-size step-up transformer to increase the ratio of the number of turns between the excitation winding and the output winding to a very high ratio, the number of turns in the output winding can be increased as a whole of the step-up transformer 10; therefore, high voltage with a high boosting ratio can be obtained stably and safely. However, the number of transformers composing the step-up transformer 10 may be one, or can be three or more. If output windings of multiple transformers are connected in parallel with one another, an output voltage is equivalent to that of one transformer; however, an output current can be made double and an output power can be made equivalent to that of when output windings are connected in series. Alternatively, excitation windings of multiple transformers may be connected in series so as to let a current through the excitation windings at the same time.

Incidentally, because any one of multiple transformers composing the step-up transformer 10 is provided with the auxiliary winding Nh and the tertiary winding Nd, it is difficult to let the multiple transformers have exactly the same properties; however, output power values of a feedback winding, the tertiary winding, and the like are small, so there is no problem. Furthermore, an output winding of any one of the multiple transformers composing the step-up transformer 10 can be provided with a tap, and a voltage with a waveform whose peak value is smaller than an output voltage $V_{out}$ of the output winding may be generated by part of the output winding in synchronization with the output voltage $V_{out}$ and used as an output-voltage detection signal $S_{out}$. However, the step-up transformer being composed of multiple transformers is not fundamental to the present invention, and the step-up transformer may be composed of one transformer.

As a characteristic configuration of this inverter device according to the present invention, the inverter device is provided with units for controlling the peak voltage value of AC output voltage to be constant even if input voltage changes.

First, as an input-voltage detecting unit for detecting a state of input voltage $V_{in}$, as a voltage, an input-voltage detecting circuit 14 is provided. This input-voltage detecting circuit 14 is composed of a transformer for stepping down an AC input voltage $V_{in}$, for example, from a commercial power supply and a full-wave rectifier circuit for full-wave rectifying the stepped-down AC voltage. The pulsating voltage obtained by full-wave rectifying the stepped-down AC voltage is output as an input-voltage detection signal $S_{in}$ indicating a detected input voltage value. Alternatively, as the input-voltage detecting unit, there may be provided a circuit that resistively divides an input voltage $V_{in}$ (DC) full-wave rectified by the full-wave rectifier circuit 11 and generates an input-voltage detection signal $S_{in}$. The input voltage is generally not so high, and therefore can be easily detected by various means.

Furthermore, the peak value of the output voltage $V_{out}$ of the step-up transformer 10 becomes a value according to energy stored by excitation current Ip of the transformers T1 and T2 flowing in a period in which the switching element Q is turned on. This excitation current Ip has a shape of a right triangle, and its peak current value is proportional to an input voltage $V_{in}$ and an ON period ($T_{on}$) of the switching element Q. Current (drain current) Id(Q) flowing through the switching element Q equals 2·Ip (Id(Q)=2·Ip); this current Id(Q) is converted into a voltage and detected as a detected current value $S_{id}$ by a current detecting unit 15.

Figure 2A:
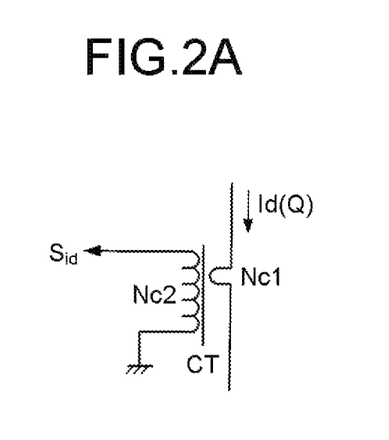
FIGS. 2A and 2B are circuit diagrams showing another specific example of a current detecting unit in FIG. 1.

As the current detecting unit 15, a current transformer can be used. For example, as shown in FIG. 2A, a primary winding Nc1 of a current transformer CT is inserted in series in a drain-side line (current path) of the switching element Q indicated in a circle A in FIG. 1. Then, a detected current value (a current detection signal) $S_{id}$ of a voltage converted from current Id(Q) is output from a secondary winding Nc2 of the current transformer CT.

The number of turns in the primary winding Nc1 of the current transformer CT is 1 to 3 turns, and the number of turns in the secondary winding Nc2 is several hundred to several thousand times as many turns as the primary winding Nc1; the current transformer CT outputs a voltage according to the ratio of the number of turns between the primary winding Nc1 and the secondary winding Nc2. However, it is necessary to adjust the levels of both detection signals such that the variation level of an input-voltage detection signal $S_{in}$ is preferably within a range equal to or lower than the peak value of a detected current value (a current detection signal) $S_{id}$. Furthermore, the primary winding Nc1 of the current transformer CT may be inserted in series in a source-side line (current path) of the switching element Q indicated in a circle B in FIG. 1.

Figure 2B:
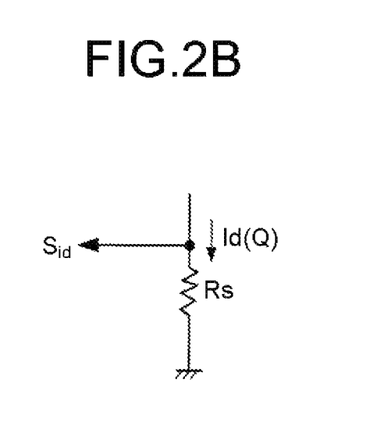

As another example of the current detecting unit 15, a resistance may be used. For example, as shown in FIG. 2B, a resistance Rs is inserted in series in the source-side line of the switching element Q indicated in the circle B in FIG. 1. Then, a voltage generated between terminals of the resistance Rs can be used as a detected current value (a current detection signal) $S_{id}$ of a voltage converted from current Id(Q). Also in this case, it is necessary to adjust the levels of both detection signals such that the variation level of an input-voltage detection signal $S_{in}$ is preferably within a range equal to or lower than the peak value of a detected current value (a current detection signal) $S_{id}$. In the case of this example, a loss is constantly generated due to the resistance Rs; however, there is an advantage that the current detecting unit 15 can be composed of an inexpensive circuit.

In the present embodiment, the inverter device is further provided with a zero-cross circuit 16 for detecting an output-voltage generating period in which output voltage $V_{out}$ is generated with respect to each switching cycle of the switching element Q on the basis of an output-voltage detection signal $S_{out}$ of the output-voltage detecting unit. Therefore, the zero-cross circuit 16 is an output-voltage-generating-period detecting unit; the output-voltage generating period is a period in which the switching element Q is turned off and does not apply excitation current to the step-up transformer 10, so is also referred to as an OFF period.

The zero-cross circuit 16 according to the present embodiment outputs, as a zero-cross signal Zx, a high-level signal during a period from the point at which an output-voltage detection signal $S_{out}$ becomes a slightly positive voltage to the point at which an output-voltage detection signal $S_{out}$ reaches the zero level, and a low-level signal in the other period. This zero-cross signal Zx is input to the control IC 12 so that the control IC 12 can confirm the output-voltage generating period.

Furthermore, there is also provided an inverting circuit 17 that inverts a zero-cross signal Zx output from the zero-cross circuit 16 and outputs an inverted zero-cross signal /Zx. Moreover, a comparator circuit 18 is provided as a comparing unit that compares an input-voltage detection signal $S_{in}$, which is a detected input voltage value detected by the input-voltage detecting circuit 14, with a detected current value (a current detection signal) $S_{id}$ detected by the current detecting unit 15. This comparator circuit 18 detects a period in which the detected current value $S_{id}$ exceeds the input-voltage detection signal $S_{in}$ (hereinafter, referred to as a "high-current period"), and outputs a high-level signal Di only in the high-current period.

This signal Di can be directly applied to a base of a transistor Tr; however, in the present embodiment, just in case, an output signal Di of the comparator circuit 18 and an inverted zero-cross signal /Zx are input to an AND circuit 19, and an AND output Se from the AND circuit 19 is applied to the base of the transistor Tr. A collector of the transistor Tr is connected to a feedback terminal of the control IC, and an emitter of the transistor Tr is connected to the ground. Therefore, an AND output Se corresponding to a signal Di only in a period in which no output voltage $V_{out}$ is generated is applied to the base of the transistor Tr, and a collector voltage of the inverted AND output Se is applied as a feedback signal Sf to the control IC.

Accordingly, on the basis of the feedback signal Sf corresponding to the signal Di which is information indicating the high-current period, the control IC 12 controls the duty ratio of a switching signal Sp in the next cycle and adjusts the period in which the switching element Q is turned on. At this time, it is preferable for the control IC 12 which is a control circuit to adjust the period in which the switching element Q is turned on in such a manner that the longer the high-current period is than the reference value, the longer the period in which the switching element Q is turned on; the shorter the high-current period is than the reference value, the shorter the period in which the switching element Q is turned on.

When the high-current period is longer than a reference value, the input voltage $V_{in}$ has decreased; therefore, the period in which the switching element Q is turned on is lengthened so as not to decrease energy stored in the step-up transformer 10. When the high-current period is shorter than the reference value, the input voltage $V_{in}$ has increased; therefore, the period in which the switching element Q is turned on is shortened so as not to increase energy stored in the step-up transformer 10. By adjusting the period in which the switching element Q is turned on in this way, the peak value of output voltage $V_{out}$ can be maintained approximately constant even if the input voltage $V_{in}$ varies. In this first embodiment, it is also possible to omit the tertiary winding Nd of the transformer T1 which is an output-voltage detecting unit, the zero-cross circuit 16, the inverting circuit 17, and the AND circuit 19.

Figure 3:
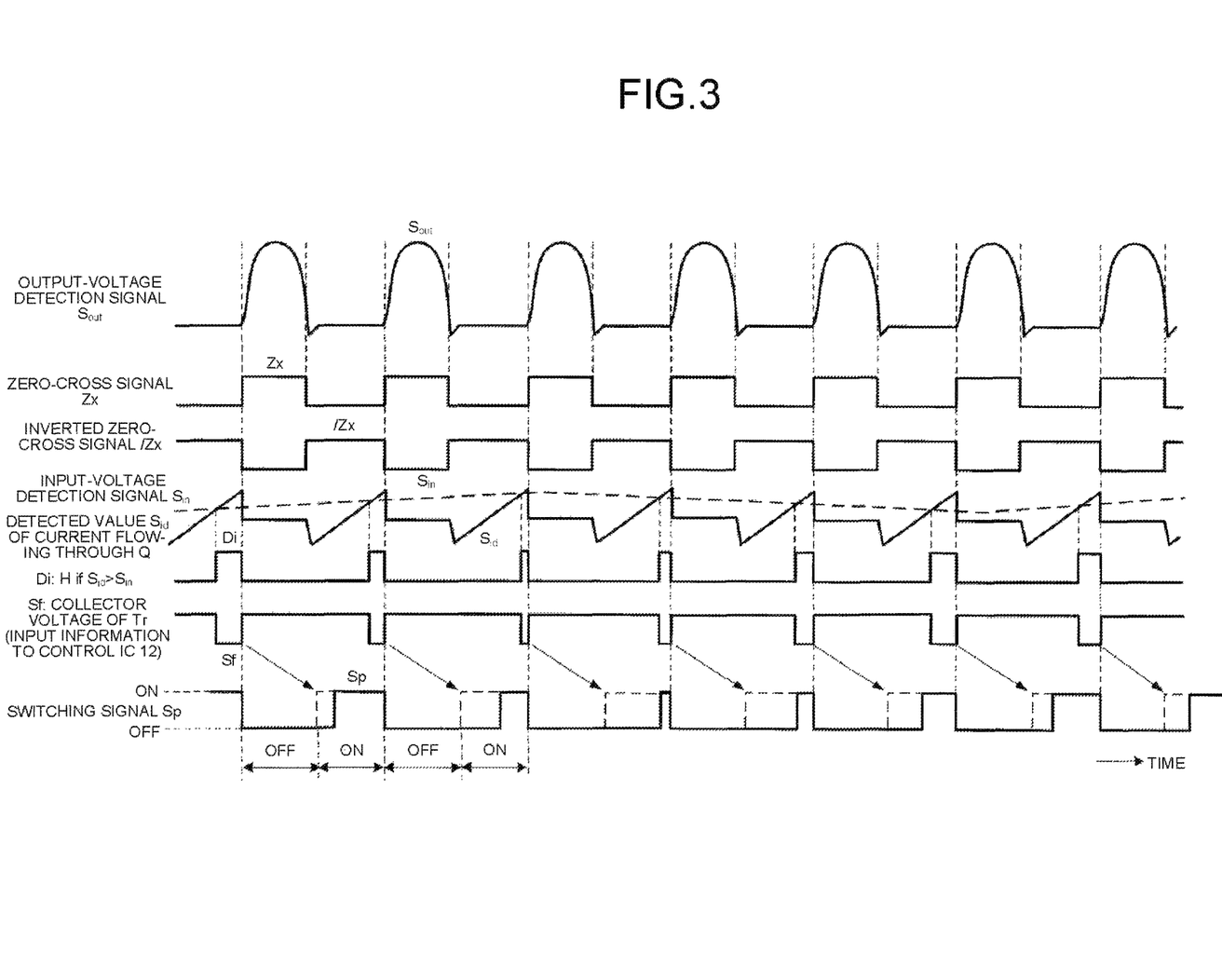
FIG. 3 is a timing chart showing respective waveforms of signals for explaining the operation of the inverter device shown in FIG. 1.

Here, an output-voltage control operation performed by the inverter device shown in FIG. 1 is explained with FIG. 3. FIG. 3 is a timing chart showing respective waveforms of signals for explaining the operation of the inverter device shown in FIG. 1. In FIG. 3, the ON period and the OFF period are alternately repeated; a set of an ON period and an OFF period is one switching cycle. The OFF period is a period in which the switching element Q is turned off, no excitation current Ip flows through the step-up transformer 10, and an output voltage $V_{out}$ is generated. However, an output voltage $V_{out}$ is not always generated in all the OFF periods.

The ON period is a period in which the switching element Q is turned on, thereby excitation current Ip flows through the step-up transformer 10, and energy is stored in the step-up transformer 10. However, the switching element Q is not always turned on in all the ON periods; a period in which the switching element Q is actually turned on (referred to as an "ON time") is changed so that the peak value of output voltage is controlled to be constant even if input voltage varies.

Output-voltage detection signal $S_{out}$ shown in FIG. 3 indicates a waveform of voltage output from the tertiary winding of the transformer T1 shown in FIG. 1. This is a positive half-wave waveform that changes in the same pattern in synchronization with output voltage $V_{out}$ and is a signal whose peak value is equal to or smaller than a thousandth to hundredth part of output voltage $V_{out}$ and is about a few to tens of volts (preferably, about 10 volts). Zero-cross signal Zx is a signal which becomes high level "H" only in a period in which an output-voltage detection signal $S_{out}$ is a positive value (corresponding to a period in which an output voltage $V_{out}$ is a positive value) and is low level "L" in the other periods. Inverted zero-cross signal /Zx is an inverted signal of a zero-cross signal Zx, and becomes high level "H" only in a period in which an output-voltage detection signal $S_{out}$ is not a positive value and becomes low level "L" in a period in which an output-voltage detection signal $S_{out}$ is a positive value.

Detected current value (current detection signal) $S_{id}$ of current Id flowing through the switching element Q is detected by the current detecting unit 15 shown in FIG. 1, and is generated in a shape of a right triangle in a period in which no output-voltage detection signal $S_{out}$ is output and an inverted zero-cross signal /Zx is "H". The comparator circuit 18 compares this detected current value $S_{id}$ with an input-voltage detection signal $S_{in}$ (indicated by a broken line in FIG. 3) detected by the input-voltage detecting circuit 14. Output signal Di of this comparator circuit 18 is a high-current-period signal that becomes high level "H" only in a period in which a detected current value $S_{id}$ exceeds an input-voltage detection signal $S_{in}$ (a period of $S_{id} > S_{in}$: a high-current period).

An AND output Sa obtained by performs a logical AND of this high-current-period signal Di and the inverted zero-cross signal /Zx is about the same as the high-current-period signal Di. A collector voltage of the inverted AND output Sa inverted by the transistor Tr shown in FIG. 1 becomes a feedback signal Sf which is input information to the control IC 12. The control IC 12 controls the duty ratio of switching signal Sp on the basis of a period in which this feedback signal Sf is low level "L" (information indicating a high-current period). That is, the control IC 12 adjusts the period in which the switching element Q is turned on next (a period of high level) so that the peak value of output voltage $V_{out}$ is maintained constant.

In an example shown in FIG. 3, when the high-current period is longer than the reference value, the input voltage has decreased; therefore, the period in which a switching signal Sp, which turns the switching element Q on, is high level "H" is lengthened to lengthen the period of applying excitation current Ip. When the high-current period is shorter than the reference value, the input voltage has increased; therefore, the period in which a switching signal Sp, which turns the switching element Q on, is high level "H" is shortened to shorten the period of applying excitation current Ip. In this way, the amount of energy stored in the step-up transformer 10 by excitation current Ip is adjusted so as not to vary as much as possible even if input voltage varies, thereby controlling the peak value of output voltage $V_{out}$ to be constant.

Figure 4:
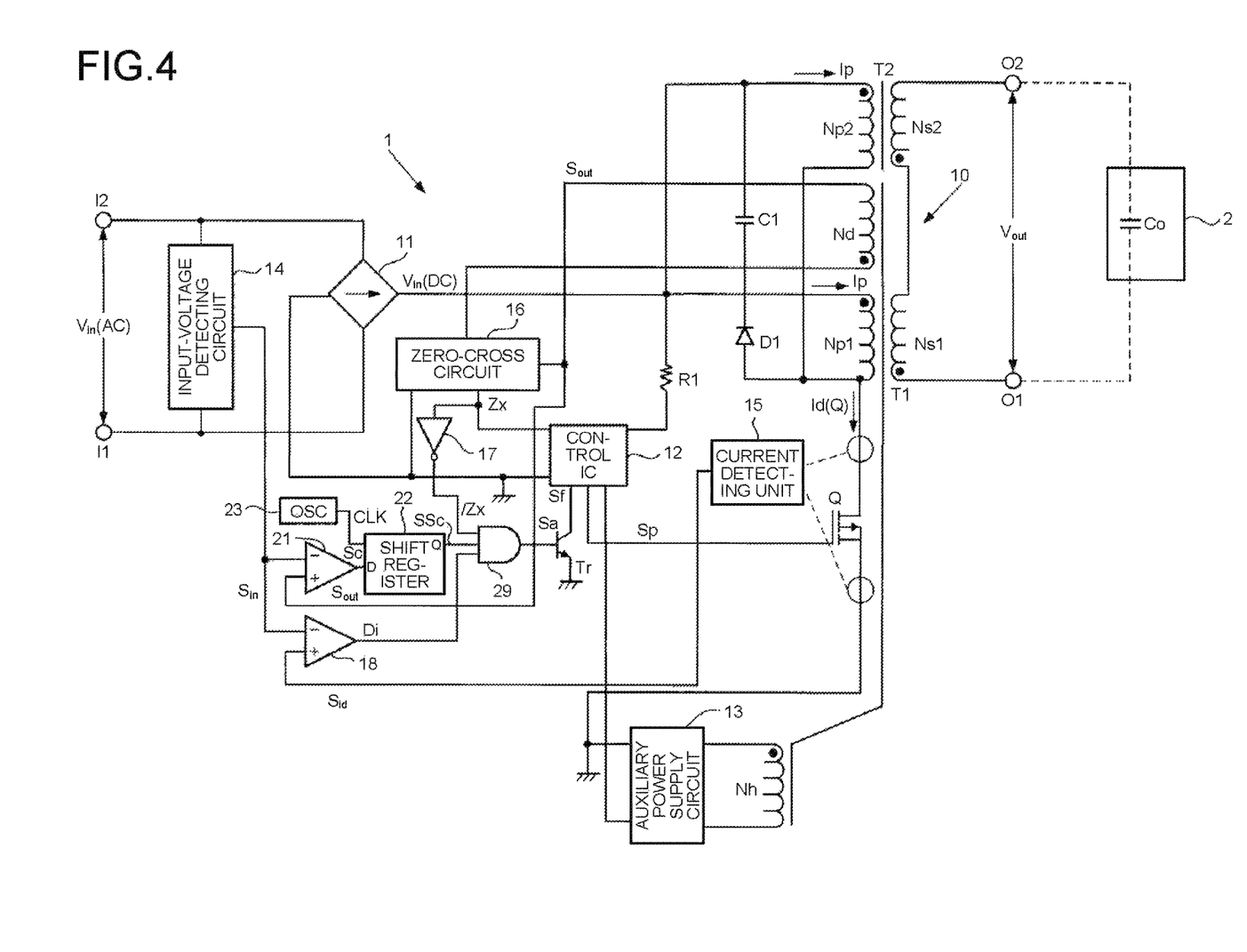
FIG. 4 is a circuit diagram showing a circuit configuration of an inverter device according to a second embodiment of the present invention.
Figure 5:
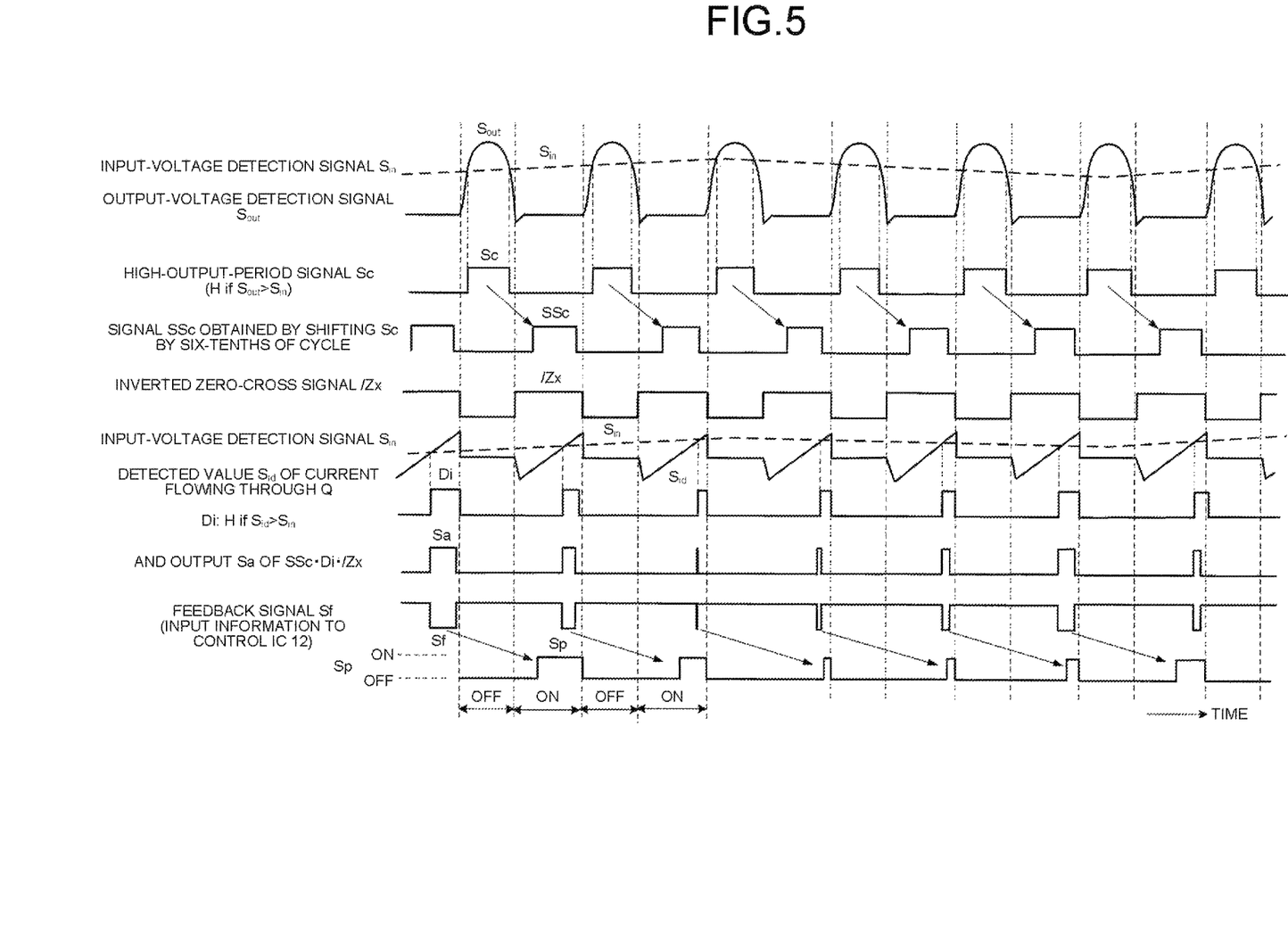
FIG. 5 is a timing chart showing respective waveforms of signals for explaining the operation of the inverter device shown in FIG. 4.

Subsequently, an inverter device according to a second embodiment of the present invention is explained with FIGS. 4 and 5. FIG. 4 is a circuit diagram showing a circuit configuration of the inverter device according to the second embodiment; FIG. 5 is a timing chart showing respective waveforms of signals for explaining the operation of the inverter device shown in FIG. 4. In FIG. 4, the same component as in FIG. 1 is assigned the same reference numeral, and description of the component is omitted.

The step-up transformer 10 of an inverter device 1' has the same configuration as that of the inverter device 1 shown in FIG. 1. Then, in the inverter device 1', the tertiary winding Nd of the transformer T1 is an output-voltage detecting unit that detects a state of output voltage $V_{out}$ on the basis of a real-time voltage. Even when an output voltage $V_{out}$ is an AC half-wave voltage with a high frequency of 15 kHz to 20 kHz and a high peak value of 10 kV or more, a voltage $S_{out}$ generated in the tertiary winding Nd varies in the same pattern in synchronization with the output voltage. Therefore, an output voltage $V_{out}$ can be faithfully detected from a real-time voltage (a voltage corresponding to an instantaneous value) by this tertiary winding Nd. Therefore, an output-voltage detection signal $S_{out}$ detected by the tertiary winding Nd indicates a detected output voltage value. Furthermore, as described above, the peak value of the output-voltage detection signal $S_{out}$, which is a voltage generated in the tertiary winding Nd, is at least a hundredth part of the output voltage $V_{out}$ or less.

Then, this inverter device 1' is provided with a comparator circuit 21 as a second comparing unit that compares an input-voltage detection signal $S_{in}$ detected by the input-voltage detecting circuit 14 with an output-voltage detection signal $S_{out}$ detected by the tertiary winding Nd which is an output-voltage detecting unit. This comparator circuit 21 detects a period in which the output-voltage detection signal $S_{out}$ exceeds the input-voltage detection signal $S_{in}$ (hereinafter, referred to as a "high-output period"), and outputs a high-output-period signal Sc which becomes high level only in the high-output period. Furthermore, the inverter device 1' is provided with a shift register 22, a shift unit that shifts a high-output-period signal Sc detected by the comparator circuit 21 to the next period in which a zero-cross signal Zx output from the zero-cross circuit 16 which is an output-voltage-generating-period detecting unit is low level.

The shift register 22 shifts a signal Sc output from the comparator circuit 21 on the basis of a clock signal CLK generated by an oscillator (OSC) 23 and outputs a signal SSc. The frequency of the clock signal CLK is a higher frequency than the switching frequency of the switching element Q. For example, if the frequency of the clock signal CLK is 10 times higher than the switching frequency (the cycle of the clock signal CLK is one-tenth), and a 6-bit shift register is used as the shift register 22, a signal Sc can be shifted by six-tenths of the cycle, and the shifted signal is output. In this way, a signal Sc can be shifted to the nearest period in which no output voltage $V_{out}$ is generated. The magnifying power of the frequency of the clock signal CLK to the switching frequency is referred to as "resolution".

This shift register 22 serves as a shift unit that shifts (delays) a high-output-period signal Sc, which is information indicating a high-output period, by a predetermined period so as to correspond to a period in which the switching element Q is turned on, and outputs the shifted signal. Then, this shift register 22 acquires a high-output-period signal Sc, shifts (delays) the high-output-period signal Sc by a predetermined period, and outputs the shifted signal in synchronization with a clock signal CLK with a higher frequency than the switching frequency.

Furthermore, in this second embodiment, the comparator circuit 18, which compares an input-voltage detection signal $S_{in}$ of input voltage detected by the input-voltage detecting circuit 14 with a detected current value (a current detection signal) $S_{id}$ detected by the current detecting unit 15, is a first comparing unit. In the same manner as in the first embodiment, the comparator circuit 18 detects a period in which the detected current value $S_{id}$ exceeds the input-voltage detection signal $S_{in}$ (hereinafter, referred to as a "high-current period"), and outputs a high-current-period signal Di that becomes high level only in the high-current period.

Then, the high-current-period signal Di, the signal SSc obtained by shifting the high-output-period signal Sc by the shift register 22, and an inverted zero-cross signal /Zx of the zero-cross signal Zx inverted by the inverting circuit 17 are input to an AND circuit 29 and subjected to AND operation. An AND output Sa, which is output information from the AND circuit 29, is applied to the base of the transistor Tr, and a collector voltage of the inverted AND output Sa is applied as a feedback signal Sf to the control IC.

Accordingly, on the basis of the feedback signal Sf corresponding to the signal Di which is information indicating the high-current period and the signal SSc which is information indicating the high-output period, the control IC 12 controls the duty ratio of a switching signal Sp and adjusts the period in which the switching element Q is turned on. At this time, it is preferable for the control IC 12 which is a control circuit to adjust the period in which the switching element Q is turned on in such a manner that the longer both the high-current period and the high-output period are than the respective reference values, the longer the period in which the switching element Q is turned on; the shorter both the high-current period and the high-output period are than the respective reference values, the shorter the period in which the switching element Q is turned on.

An output-voltage control operation performed by the inverter device 1' shown in FIG. 4 is explained with the timing chart shown in FIG. 5. In the upper part of FIG. 5, an output-voltage detection signal with an AC half-wave waveform $S_{out}$ which is also shown in FIG. 3 is depicted by a solid line, and an input-voltage detection signal $S_{in}$ is depicted by a broken line to be overlapped with the output-voltage detection signal $S_{out}$. Then, a high-output-period signal Sc becomes high level "H" in a high-output period in which the output-voltage detection signal $S_{out}$ exceeds the input-voltage detection signal $S_{in}$ ($S_{out}$>$S_{in}$), by comparing the output-voltage detection signal $S_{out}$ with input-voltage detection signal $S_{in}$. A signal obtained by the shift register 22 shifting the high-output-period signal Sc by six-tenths of the switching cycle is used as a signal SSc.

An inverted zero-cross signal /Zx, a current detection signal $S_{id}$ indicating a detected value of current flowing through the switching element Q, and a high-current-period signal Di that becomes high level "H" only in a period in which the current detection signal $S_{id}$ exceeds the input-voltage detection signal $S_{in}$ indicated by a broken line are the same as in FIG. 3. Then, the signal SSc obtained by shifting the high-output-period signal Sc, the high-current-period signal Di, and the inverted zero-cross signal /Zx are subjected to AND operation by the AND circuit 29, thereby obtaining an AND output (output information) Sa. This AND output Sa is applied to the base of the transistor Tr, and a collector voltage of the inverted AND output Sa is a feedback signal Sf to be input information to the control IC 12.

According to the low-level pulse width of the feedback signal Sf, the control IC 12 controls the duty ratio of a switching signal Sp in the next cycle and adjusts the period in which the switching element Q is turned on. Accordingly, the period in which the switching element Q is turned on in the next switching cycle is adjusted according to the signal Di which is information indicating the high-current period and the signal SSc which is information indicating the high-output period.

In this example, the longer both the high-current period and the high-output period are than the respective reference values, the lower the input voltage is; therefore, the period in which the switching element Q is turned on next is lengthened. The shorter both the high-current period and the high-output period are than the respective reference values, the higher the input voltage is; therefore, the period in which the switching element Q is turned on next is adjusted to be shortened. In this way, the amount of energy stored in the step-up transformer 10 from excitation current Ip is adjusted so as not to vary as much as possible even if input voltage $V_{in}$ varies, thereby controlling the peak value of output voltage $V_{out}$ to be constant.

In the embodiments described above, the step-up transformer 10 is composed of the two transformers T1 and T2 which have respective separate cores and the same characteristics; however, the step-up transformer 10 may be composed of the one transformer T1, or may be composed of three or more transformers. Furthermore, respective excitation windings of a plurality of transformers are connected in parallel; however, the excitation windings of the transformers may be connected in series. Likewise, respective output windings of the transformers are connected in series; however, the output windings of the transformers may be connected in parallel.

The inverter device according to the present invention is suitable to be used as a power source of a plasma generator. Atmospheric pressure plasma generated by such a plasma generator is applied to various industrial products as a means for surface treatment such as the surface modification or the removal of contaminants. When applying an adhesive such as resin, printing, coating, or the like, if preprocessing using atmospheric pressure plasma is performed on an object, the wettability can be improved.

For example, when a print printed with resin toner by an electrophotographic image forming apparatus is coated with ultraviolet curable varnish, a wax component contained in the resin toner may repel the varnish of a resin-toner portion of the print. However, if surface treatment using atmospheric pressure plasma is performed on the print, the wettability is improved, and varnish coating can be applied, thereby the added value of the print is improved.

However, the inverter device according to the present invention is not limited to plasma generators, and can be also applied to apparatus that generates plasma by corona discharge and apparatus that generates plasma in a low-pressure ambience with a little gas. Furthermore, the inverter device according to the present invention is available for high-voltage power units of various devices using AC high voltage, such as a semiconductor wafer bonding device, an image processing apparatus, a painting device, lighting equipment such as a fluorescent lamp, an air purifier, a discharge device, a backlight for liquid crystal TV, and a sterilization device.

An inverter device according to an embodiment can control the peak voltage value of AC output voltage to be constant even if input voltage changes.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An inverter device, wherein:
the inverter device causes a switching element to be turned on/off under control of a control circuit to switch an input voltage on/off, applies an excitation current to an excitation winding of a step-up transformer in a period in which the switching element is turned on, and outputs an output voltage with an alternating-current half-wave waveform from the step-up transformer in a period in which the switching element is turned off, wherein the alternating-current half-wave waveform comprises superimposed output voltages from multiple output windings that are connected in series, the inverter device comprising:
an input-voltage detecting unit that detects a state of the input voltage, as a voltage;
a current detecting unit that converts a current flowing through the switching element into a voltage to detect the current; and
a comparing unit that compares a detected current value detected by the current detecting unit with a detected input voltage value detected by the input-voltage detecting unit, and detects a high-current period in which the detected current value exceeds the detected input voltage value, wherein
based on information indicating the high-current period detected by the comparing unit, the control circuit adjusts the period in which the switching element is turned on.

2. The inverter device according to claim 1, wherein the control circuit adjusts the period in which the switching element is turned on in such a manner that the longer the high-current period is than a reference value, the longer the period in which the switching element is turned on; the shorter the high-current period is than the reference value, the shorter the period in which the switching element is turned on.

3. The inverter device according to claim 1, wherein the current detecting unit converts the current flowing through the switching element into a voltage using a current transformer inserted in a path of the current to detect the current.

4. The inverter device according to claim 1, wherein the current detecting unit converts the current flowing through the switching element into a voltage using a resistance inserted in a path of the current to detect the current.

5. The inverter device according to claim 1, wherein
the step-up transformer includes a plurality of transformers which have respective separate cores and the same characteristics, and
respective excitation windings of the plurality of transformers are connected in parallel or in series to let an excitation current through the excitation windings at the same time, and respective output windings of the plurality of transformers are connected in parallel or in series to output the output voltage.

6. An inverter device that causes a switching element turned on/off under control of a control circuit to switch an input voltage on/off, applies an excitation current to an excitation winding of a step-up transformer in a period in which the switching element is turned on, and outputs an output voltage with an alternating-current half-wave waveform from the step-up transformer in a period in which the switching element is turned off, wherein the alternating-current half-wave waveform comprises superimposed output voltages from multiple output windings that are connected in series, the inverter device comprising:

an input-voltage detecting unit that detects a state of the input voltage, as a voltage;

a current detecting unit that converts a current flowing through the switching element into a voltage to detect the current;

a first comparing unit that compares a detected current value detected by the current detecting unit with a detected input voltage value detected by the input-voltage detecting unit, and detects a high-current period in which the detected current value exceeds the detected input voltage value;

an output-voltage detecting unit that detects a state of the output voltage, as a voltage corresponding to an instantaneous value thereof; and a second comparing unit that compares a detected input voltage value detected by the input-voltage detecting unit with a detected output voltage value detected by the output-voltage detecting unit, and detects a high-output period in which the detected output voltage value exceeds the detected input voltage value, wherein based on information indicating the high-current period detected by the first comparing unit and information indicating the high-output period detected by the second comparing unit, the control circuit adjusts the period in which the switching element is turned on.

7. The inverter device according to claim 6, wherein the control circuit adjusts the period in which the switching element is turned on in such a manner that the longer both the high-current period and the high-output period are than respective reference values, the longer the period in which the switching element is turned on; the shorter both the high-current period and the high-output period are than the respective reference values, the shorter the period in which the switching element is turned on.

8. The inverter device according to claim 6, further comprising:

a shift unit that shifts the information indicating the high-output period detected by the second comparing unit by a predetermined period so as to correspond to the period in which the switching element is turned on and outputs the shifted information; and an AND unit that performs a logical AND of the information indicating the high-output period shifted by the predetermined period by the shift unit and the information indicating the high-current period detected by the first comparing unit, wherein based on output information of the AND unit, the control circuit adjusts the period in which the switching element is turned on.

9. The inverter device according to claim 8, wherein the shift unit is a shift register that acquires the information indicating the high-output period, shifts the information by the predetermined period and, outputs the shifted information in synchronization with a clock signal with a higher frequency than a switching frequency.

10. The inverter device according to claim 6, wherein a tertiary winding installed in the step-up transformer generates a voltage with a waveform whose peak value is smaller than the output voltage in synchronization with the output voltage.

* * * * *